United States Patent [19]

Robinson

[11] Patent Number: 4,511,452
[45] Date of Patent: * Apr. 16, 1985

[54] PLURAL STAGE DESALTING/DEHYDRATING APPARATUS

[75] Inventor: James R. Robinson, Houston, Tex.

[73] Assignee: Petrolite Corporation, St. Louis, Mo.

[*] Notice: The portion of the term of this patent subsequent to Feb. 22, 2000 has been disclaimed.

[21] Appl. No.: 467,039

[22] Filed: Feb. 16, 1983

Related U.S. Application Data

[62] Division of Ser. No. 187,282, Sep. 15, 1980, Pat. No. 4,374,724.

[51] Int. Cl.$^3$ ................... C10G 33/02; B01D 17/06
[52] U.S. Cl. ................................ 204/302; 204/190
[58] Field of Search ........................ 204/302–308, 204/186, 188, 190

[56] References Cited

U.S. PATENT DOCUMENTS

| | | | |
|---|---|---|---|
| 2,681,311 | 6/1954 | DeWit | 204/302 |
| 3,458,429 | 7/1969 | Watson et al. | 204/302 |
| 3,649,516 | 3/1972 | Cole, Jr. et al. | 204/302 |
| 4,149,958 | 4/1979 | Martin | 204/302 |
| 4,182,672 | 1/1980 | Martin | 204/302 |

Primary Examiner—G. L. Kaplan
Assistant Examiner—William T. Leader
Attorney, Agent, or Firm—Pravel, Gambrell, Hewitt & Kimball

[57] ABSTRACT

A desalter/dehydrater having a plurality of electrified coalescing stages in a single vessel wherein the stages are isolated hydraulically to allow parallel or serial stage operation and the emulsion being treated is introduced at one side of the vessel and caused to flow to the opposite side between horizontal planar permeable electrodes. In one embodiment, several electrical stages are operated in parallel to increase vessel throughput capacity. In another embodiment, series operation is employed, wherein each successive stage receives the product from the preceding stage as feed, with fresh water being added. The number of stages is one less than the number of the electrodes.

5 Claims, 15 Drawing Figures fig.1 fig.2 fig.3 fig.4 fig.5 fig.6 fig.7 fig.8 fig.8a fig.8b fig.8c fig.8d fig.8e fig.8f fig.8g

PLURAL STAGE DESALTING/DEHYDRATING APPARATUS

CROSS REFERENCE TO RELATED APPLICATIONS

This is a divisional of U.S. patent application Ser. No. 187,282 entitled "Plural Stage Desalting/Dehydrating System" filed Sept. 15, 1980, now U.S. Pat. No. 4,374,724 issued on Feb. 22, 1983.

FIELD OF THE INVENTION

This invention relates to apparatus and process useful for desalting and/or dehydrating oil-continuous emulsions such as crude petroleum oils, although they can be used in the resolution of other emulsions, which term is herein used as including dispersions. More particularly, the invention relates to improved apparatus and processes of this type employing multiple electrode/distributor systems located in a signel vessel.

BACKGROUND OF THE INVENTION

It is conventional to desalt or dehydrate oil-continuous emulsions by introducing such emulsions directly into an electric treating field of sufficient intensity to coalesce the suspended droplets of the dispersed phase into masses of sufficient size to gravitate from the oil. The dispersed phase of such emulsions is composed of a material, usually aqueous, that is sufficiently immiscible with the oil to produce an internal or dispersed phase. Initially, the dispersed droplets are of such small size or are so stablilized that they will not readily gravitate from the oil phase. However, the electric field coalesces such dispersed droplets, and it is found that the resulting coalesced masses gravitate rapidly from the oil, usually in the same container as that in which electric treatment takes place. In a desalting operation, a quantity of water may be mixed with the incoming crude oil in a valve or other mixer, all as well known, so that a more complete removal of salt from the oil may be accomplished. Typical of such prior art dehydrator/desalters are those described in the following U.S. patents:

| | | | |
|---|---|---|---|
| 1,838,922 | 2,543,996 | 2,894,895 | 3,592,756 |
| 2,033,446 | 2,557,847 | 2,963,414 | 3,531,393 |
| 2,041,954 | 2,848,412 | 3,141,000 | 3,577,336 |
| 2,072,888 | 2,855,360 | 3,206,686 | 3,649,516 |
| 2,443,646 | 2,880,158 | 3,250,695 | 3,672,127 |
| 2,527,690 | 2,892,768 | 3,458,429 | 3,736,245 | and German Pat, No. 1,014,076 (Helmut Stock; Aug. 22, 1957).

U.S. Pat. Nos. 4,149,958 and 4,182,672 to Robert B. Martin disclose apparatus and processes for desalting or dehydrating emulsions of the type above described, wherein the apparatus has a plurality of electrified coalescing stages in a single vessel, wherein the stages are hydraulically substantially independent and adapted for parallel or series stage operations. The expression "electrified" denotes the presence of an electric field, as above described. In one embodiment shown by Martin, two or more electrified stages, each separately energized, are operated in parallel to proportionately increase vessel throughput capacity. In another embodiment, especially designed for desalting, series operation is employed, wherein each successive stage receives the product of the preceding stage as feed, with fresh and/or recycled water being added.

The embodiments specifically illustrated and described in the Martin patents incorporate centrally positioned emulsion inlet distributors between horizontally disposed planar permeable electrodes in vertically spaced relationship. These distributors decrease the effective space between electrodes unless the top and bottom electrodes are provided with humps to allow more clearance between the distributors and the electrodes. Alternatively, if the electrodes are not provided with humps, the top electrode would, in practice, have a hole in it which would be directly above the distributor so that the distributor, which is at ground potential, would be electrically separated from the top electrode by at least the same distance as between adjacent electrodes. A similar hole and clearance would be needed for the other electrodes.

The necessity for humps in the bottom and top electrodes and/or central holes in the electrodes creates clearance and design problems. Moreover, if the center electrode in the two stage treaters of Martin Pat. Nos. 4,149,958 and 4,182,672, with a double box distributor arrangement, is energized rather than grounded, it would require such electrode to be in two separate parts, one on each side of the distributor assembly.

Further, in Martin's specific embodiments of the series plural stage desalter, collectors at each side of the treating vessel are provided in all but the final stages. These have to be tied together hydraulically and balanced to draw equally from each side.

It is an object of this invention to provide a plural stage dehydrating/desalting apparatus, especially useful for desalting crude oil which avoids the above discussed problems of the Martin apparatus referred to.

It is a further object of this invention to provide such a dehydrating/desalting apparatus which accommodates a separate distributor for each stage with a minimum of lost electrode area and which is adapted to the use of a middle energized electrode as a single unit, which is easier to hang on insulators and charge.

It is still a further object of this invention to provide improved processes for dehydrating and desalting crude oil employing improved plural stage dehydrating/desalting apparatus.

Additional objects of the invention will be evident to those skilled in the art in the course of the following description.

SUMMARY OF THE INVENTION

The above and other objects of the invention are achieved by providing an apparatus for desalting or dehydrating oil-continuous oil-water emulsions, which has a plurality of electrified hydraulically independent coalescing stages in a single vessel, each stage being defined by parallel horizontally disposed planar permeable electrodes in vertically spaced relationship, each stage having distributor means for supplying emulsion associated therewith, the distributor means being positioned at one side of the vessel and being adapted to cause emulsion to flow to the opposite side between adjacent electrodes in hydraulically substantially independent flow. The number of stages is one less than the number of electrodes.

As adapted for two stage serial desalting, the apparatus comprises a closed vessel provided with three horizontally disposed permeable planar electrodes in vertically spaced relationship, the electrodes and the vessel interior being adapted and arranged to permit water to pass downwardly through the electrodes to the lower portion of the vessel; first stage distributor means and conduit means for supplying oil-water emulsion thereto; such distributor means being positioned at one side of the vessel and adapted to cause the emulsion to flow to the opposite side of the vessel between the bottom and middle electrode; means positioned at such opposite side for collecting the treated first stage product; second stage distributor means and conduit means for supplying emulsion thereto, such distributor means being positioned at the same side of the vessel as the first stage distributor means and adapted to cause emulsion to flow to the opposite side of the vessel between the top and middle electrode; product withdrawal and outlet means in the upper portion of the vessel; and water withdrawal means in the lower portion of the vessel.

The two stage serial desalting apparatus is further provided with first stage mixing means, conduit means for supplying oil feed and water thereto, such mixing means being adapted to supply oil-water emulsion to the first stage distributor means; second stage mixing means, pumping and conduit means for withdrawing the first stage product from the first stage collecting means and passing it to the second stage mixing means; conduit means for supplying water to the second stage mixing means, such second stage mixing means being adapted to supply emulsion to the conduit means for supplying emulsion to the second stage distributor means.

It is preferred that all three electrodes in the two stage desalter be energized.

As adapted for serial stage desalting in three or more stages, the apparatus comprises a closed vessel provided with a plurality of horizontally disposed planar permeable electrodes in vertically spaced relationship, the electrodes and the vessel interior being adapted and arranged to permit water to pass downwardly through the electrodes to the lower portion of the vessel; first stage distributor means and conduit means for supplying oil-water emulsion thereto, such distributor means being positioned at one side of the vessel and adapted to cause the emulsion to flow in a first stage treatment to the opposite side of the vessel between the bottom electrode and the electrode above it; means positioned at such opposite side of the vessel for collecting the treated first stage product; second stage distributor means and conduit means for supplying second stage emulsion to the second stage distributor means, the latter being positioned at the same side of the vessel as the first stage distributor means and adapted to cause the second stage emulsion to flow to the opposite side of the vessel between the electrode next above the bottom one and the electrode next above that; means positioned at such opposite side for collecting the treated second stage product; at least one additional stage distributor means and conduit means for supplying additional stage emulsion to it, the additional stage distributor means being positioned at the same side of the vessel as the other distributor means and adapted to cause the additional stage emulsion to flow to the opposite side of the vessel between electrodes defining the respective remaining stages; means positioned at such opposite side for collecting the treated additional stage products, except for the last stage; product withdrawal and outlet means in the upper portion of the vessel; and water withdrawal means in the lower portion of the vessel.

The above desalting apparatus is further provided with mixing means for each stage and conduit means for supplying oil feed and water to each mixing means, the mixing means being adapted to supply oil-water emulsion to the corresponding distributor means; pumping means and conduit means for withdrawing products from the collecting means of each stage other than the last and passing it to the mixing means for the succeeding stage; and water supply means for each mixing means.

In an embodiment for parallel stage desalting and/or dehydrating emulsions the apparatus comprises a closed vessel provided with a plurality of coalescing stages, the stages being hydraulically substantially independent; a plurality of horizontally disposed planar electrodes in vertically spaced relationship defining these stages; distributor means for each stage at one side of the vessel and positioned and adapted to cause emulsion to flow between adjacent electrodes; common conduit means for supplying emulsion to each distributor means; product withdrawal and outlet means in the upper portion of the vessel; and water withdrawal means in the lower portion. The permeable electrodes and the vessel interior are adapted and arranged to permit water to pass downwardly through the electrodes to the lower portion of the vessel.

In a preferred embodiment of the parallel stage treater, there are three electrodes defining two parallel stages and it is further preferred that all of the electrodes be energized.

The apparatus includes mixing means adapted to supply emulsion to the conduit means for supplying emulsion to the distributor means; and conduit means for supplying feed and water to the mixing means.

The desalting/dehydrating apparatus is preferably provided with means for controlling the level of water in the lower portion of the treating-vessel at a predetermined position.

The vessel is preferably horizontally elongated, being most preferably in the form of a horizontal cylinder substantially longer in horizontal length than width. However, the vessel may be in the form of a sphere or of other suitable form.

The distributor means for each stage may be provided by a separate structure or they may be incorporated in a single integral structure.

BRIEF DESCRIPTION OF THE DRAWINGS

Referring to the drawings.

DESCRIPTION OF THE SPECIFIC EMBODIMENTS

Figure 1:
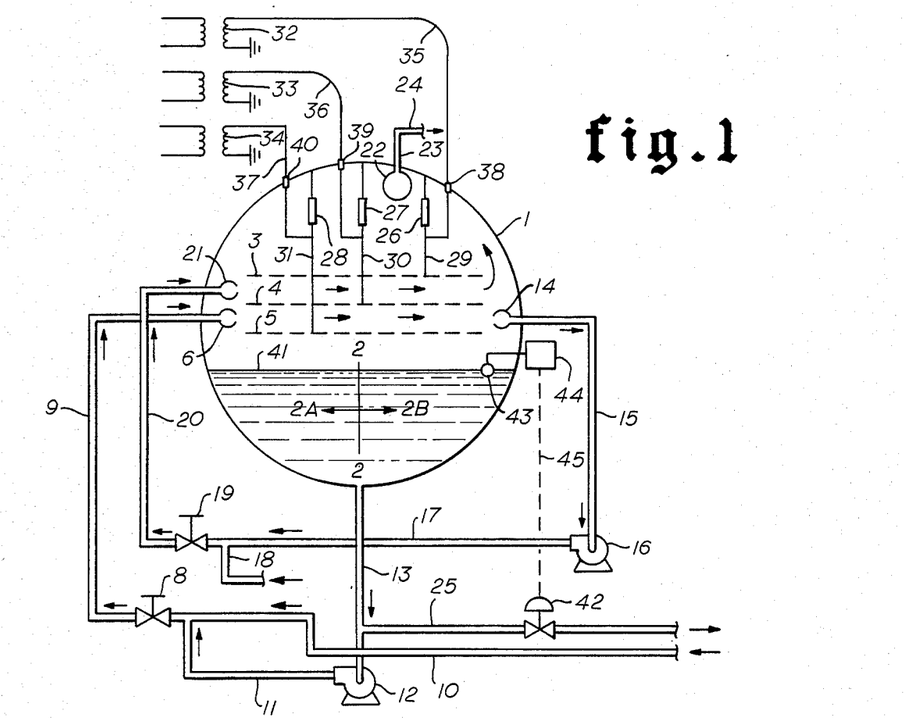
FIG. 1 is a schematic transverse vertical cross-section of one embodiment of the treating apparatus of the present invention intended for serial stage operation.
Figure 2:
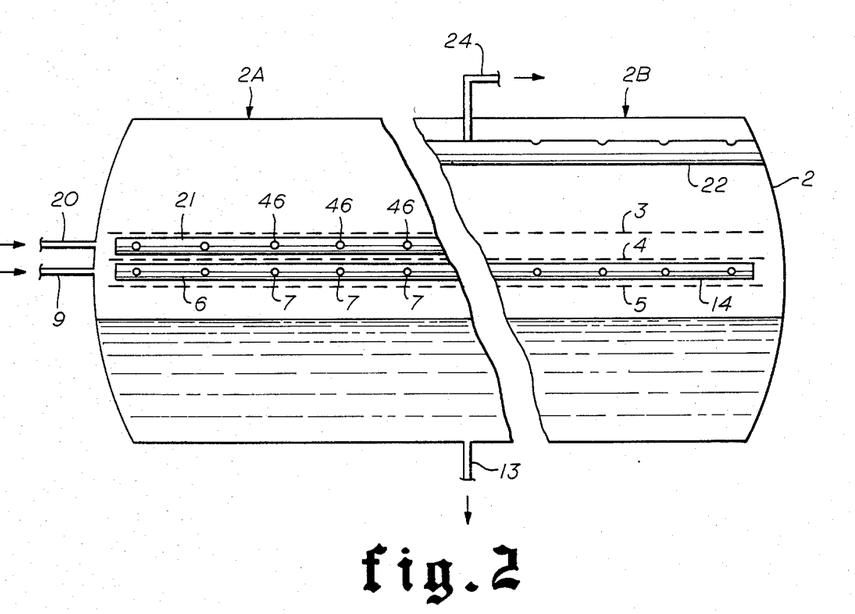
FIG. 2 is a longitudinal vertical cross-section taken along the line 2—2 of the treater shown in FIG. 1; 2A and 2B being partial length sections taken in the direction of arrows 2A and 2B, respectively.

FIGS. 1 and 2 illustrate a two-stage serial desalter consisting one embodiment of the invention. The desalter consists of a horizontally disposed generally cylindrical vessel 1 having rounded ends 2, which may suitably have a diameter of about 8 to 14 feet. Lengths of about 25 and 49 feet and as much as 133 feet are suitable with a 12 foot diameter vessel. Inside the vessel 1 are three horizontally disposed planar electrodes 3, 4 and 5, which extend horizontally almost the entire length and width of the vessel, but are not in contact with the sides thereof. The electrodes 3, 4 and 5 are permeable, e.g., they may be formed of a grid of metal rods or pipes, suitably of cold finished steel, of a structure similar to that shown in U.S. Pat. No. 2,880,158 to Delber W. Turner.

A distributor 6, serving as the first stage distributor, is positioned at one side of vessel 1 and extends longitudinally for most of the length of the vessel. The distributor 6, shown here as a pipe with a row of orifices 7 along its length, is positioned so that the orifices face the interior of the vessel 1 at about midway between electrodes 4 and 5. Distributor 6 is supplied by mixing valve 8 via conduit 9. Mixing valve 8 is supplied by raw oil conduit 10 and recycle water conduit 11, which, as shown, is connected with pump 12 and conduit 13 and/or a fresh water source, not shown. An interstage outlet collector 14, which may be a pipe with holes drilled therein, extends longitudinally along the side of vessel 1 opposite the side at which distributor 6 is positioned, and is connected to conduit 15 which leads to oil recycle pump 16 and thence to conduit 17. Conduit 18, connected to a fresh water source, leads into conduit 17, which leads to mixing valve 19. A conduit 20 extends from mixing valve 19 to second stage distributor 21, shown here as similar to first stage distributor 6 and positioned at the same side of vessel 1, with a row of orifices 46 all along its length facing the interior of the vessel 1 at about midway between electrodes 3 and 4. An outlet collector 22, which may be a pipe with holes drilled on its upper wall, extends longitudinally along the top of vessel 1 and leads to outlet 23 and treated oil effluent conduit 24. A water effluent conduit branches off from conduit 13.

Instead of the pipe distributors 6 and 21 shown, box type conduits as shown in the Martin patents above referred to, suitably modified to have the orifices only on their inwardly facing sides, may be employed. The conduits for the several stages may, if desired, be welded together.

The distributors 6 and 21 and collectors 14 and 22 may be supported from the vessel walls with angle clips, not shown, or by other conventional means of support, e.g., hangers, guy wires, brackets, rails, etc.

As shown, electrodes 3, 4 and 5 are suspended by one or more insulators 26, 27 and 28, respectively, and rods 29, 30 and 31, respectively, attached to the upper wall of vessel 1, as required to support the weight of the electrodes. As further shown, electrodes 3, 4 and 5 are each energized individually by means of transformers 32, 33 and 34, respectively, the secondaries of which have one end grounded and connect via conductors 35, 36 and 37, respectively, through entrance bushings 38, 39 and 40, with the respective electrodes. However, it is also contemplated and within the scope of this invention that electrodes 3 and 5 be energized and electrode 4 maintained at ground potential, in which case electrode 4 could rest on suitable rail bars, not shown, attached to the sides of vessel 1.

A potential difference of about 15,000 to 33,000 volts may suitably be maintained between electrodes 3 and 4 and between electrodes 4 and 5. A three phase current system may be employed to energize electrodes 3, 4 and 5. If electrode 4 is grounded, single phase current may be used to energize electrodes 3 and 5, which are then opposed electrodes, or two legs of a three phase current (3 phase open Δ) may be employed to energize these electrodes.

In operation, the temperature of the raw oil is brought to the desired temperature by any suitable procedure, such as by heat exchange with another refinery stream. The desired temperature will depend on the specific gravity and type of feed. However, in many cases of crude oil, temperatures between 100° and 350° F., with about 250° F. being optimum, are used. The pressure must be sufficient to keep the oil and water mixture liquid at the operating temperature. A small amount, for example, 1 pint per 1,000 barrels of oil, of a liquid demulsifier, e.g., a Tretolite ® DS series demulsifier, is optionally added to the oil processed.

As shown, crude oil is charged by conduit 10 and water is added via conduit 11, which is supplied by recycle conduit 13. The amount of water added is suitably about 10% of the crude oil charged. The two fluids are mixed in mixing valve 8 to form an emulsion. The emulsion is carried by conduit 9 to the first stage distributor 6, from whence it flows between middle electrode 4 and bottom electrode 5 in a generally horizontal transverse direction toward the opposite side of vessel 1, where interstage collector 14 is located. Water which has been thrown out of emulsion by the electric field between electrodes 4 and 5 falls toward the bottom of vessel 1, where a pool of collected water is maintained. The main portion of the treated oil is taken up by collector 14 and is pumped by interstage pump 16 through conduit 15 to conduit 17. A 5% addition of fresh water takes place in this conduit and is emulsified into the oil by mixing valve 19. The second stage emulsion thus formed is carried by conduit 20 to second stage distributor 21, from whence it flows between electrodes 3 and 4, substantially transversely in a generally horizontal direction to the opposite side of vessel 1. The treated oil passes upwardly near the edge of electrode 3 and along the side of vessel 1 and leaves the vessel by way of outlet collector 22, outlet 23 and conduit 24. The arrows shown in the FIGS. 1 and 2 indicate the path of the fluids through the conduits and, in a general way, inside vessel 1.

The level of the interface 41 of the water with the treated oil may be maintained automatically at the desired position in the lower portion of vessel 1. As shown in FIGS. 1 and 2, this is accomplished by means of motor valve 42 on effluent conduit 25, which valve is actuated by a float 43 connected to a control unit 44, which delivers an actuating signal through an interconnection, indicated by dashed line 45, to valve 42. The float 43 senses the water level interface 41, and the valve 42 is controlled to maintain the interface at the desired level in the lower portion of vessel 1. Various types of float and valve combinations may be employed as may be other types of level control means, such as an electrical capacitance probe.

The exit velocity of the emulsion from the orifices 7 of the distributor 6 should be such that there is enough initial energy to carry the emulsion in a substantially horizontal plane between the treating electrodes 4 and 5 to the interstage collector 14. The latter also collects some "override" of fluid from the second stage of treatment. The interstage pumping rate is controlled so that it exceeds the rate at which the treated oil is withdrawn from the treater by the second stage outlet collector 22. This may be accomplished by operating the recycle pump 16 at a pumping rate 10 to 20% faster than the charging rate.

Figure 3:
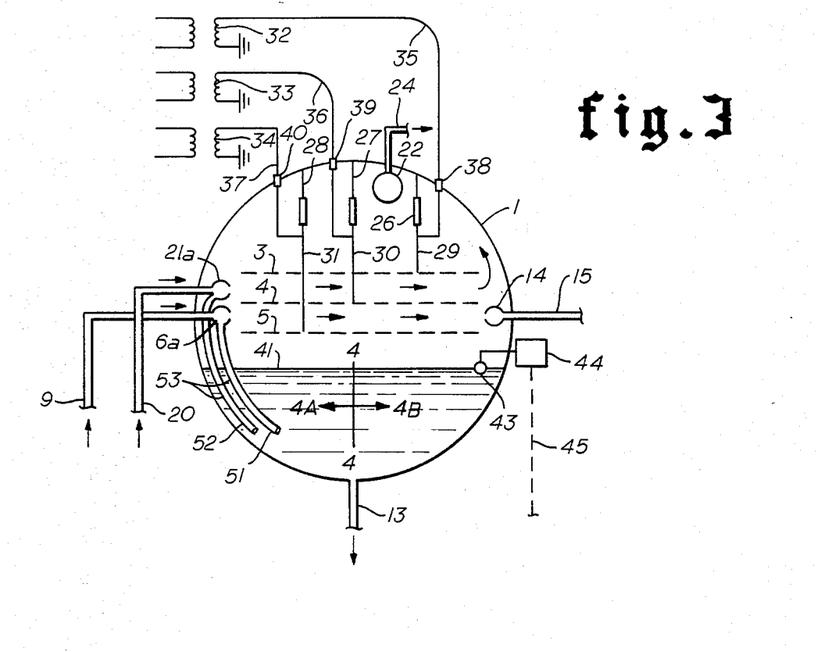
FIG. 3 is a schematic transverse vertical cross-section of another embodiment of the treating apparatus of this invention intended for serial stage operation.
Figure 4:
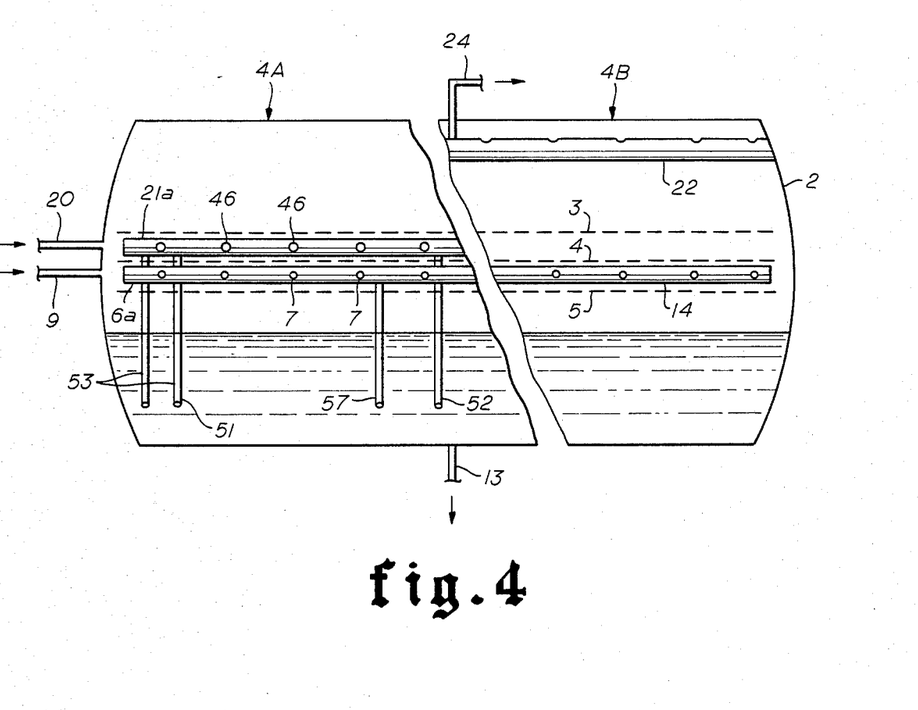
FIG. 4 is a longitudinal vertical cross-section taken along line 4—4 of the treater shown in FIG. 3; 4A and 4B being partial length sections taken in the direction of arrows 4A and 4B, respectively.

FIGS. 3 and 4 illustrate a desalter constituting another embodiment of the invention. This desalter is similar to that shown in FIGS. 1 and 2, the reference numerals corresponding to those employed in the latter figures for the same features, except that a plurality of conduits 51 and 52, which communicate hydraulically with each of the pipe distributors, shown here as 6a and 21a, respectively, extend downwardly in arcs generally concentric with the side of the treating vessel 1. Conduits 51 and 52 are open at their bottom ends and are adapted to have their lower portions immersed in the water layer maintained in the lower part of the treating vessel 1. An interface 53 exists in the conduits 51 and 52 between the water and the incoming emulsion, this interface being at a lower level than the interface 41 between the water and oil layers in vessel 1. The pressure of the water acting upwardly on the emulsions at interface 41, due to the differential head of water, forces the emulsions out of the orifices 7 and 46 in distributors 6a and 21a, respectively, and into the treating spaces between electrodes 4 and 5 and 3 and 4, respectively, with sufficient exit velocity to cause the emulsions to move in the paths described above in connection with FIGS. 1 and 2. A distributor of this type is described and claimed in concurrently filed application of Frederick D. Watson, U.S. patent application Ser. No. 187,279, filed Sept. 15, 1980, which is hereby incorporated by reference. With distributors of this type, both will operate under the same differential head of water, but the flow rate through distributor 21a is made 10 to 20% greater than that through distributor 6a by using larger orifice openings, as shown, and/or by using a larger number of orifices. Three conduits 51 and three conduits 52 per distributors 6a and 21a, respectively, may suitably be employed, although in very long treaters more may be used. The operation of the desalter is otherwise as described in connection with FIGS. 1 and 2.

Instead of the distributor means shown in FIGS. 3 and 4, a chamber generally concentric with the wall of vessel 1 and having leg portions, open at their bottom ends, adapted to extend into the water layer may be employed. A distributor of this type is also shown in the concurrently filed Watson application Ser. No. 187,729, above referred to and incorporated by reference.

Moreover, any of the "pan type" distributors of the prior art, e.g., as shown in Watson et al U.S. Pat. No. 3,458,429, Mayse et al U.S. Pat. No. 3,672,127, and Cole et al U.S. Pat. No. 3,649,576, suitably modified by being placed at a wall of vessel 1 and having the orifices only on its inwardly facing side, may also be substituted for the distributor means of FIGS. 3 and 4.

Figure 5:
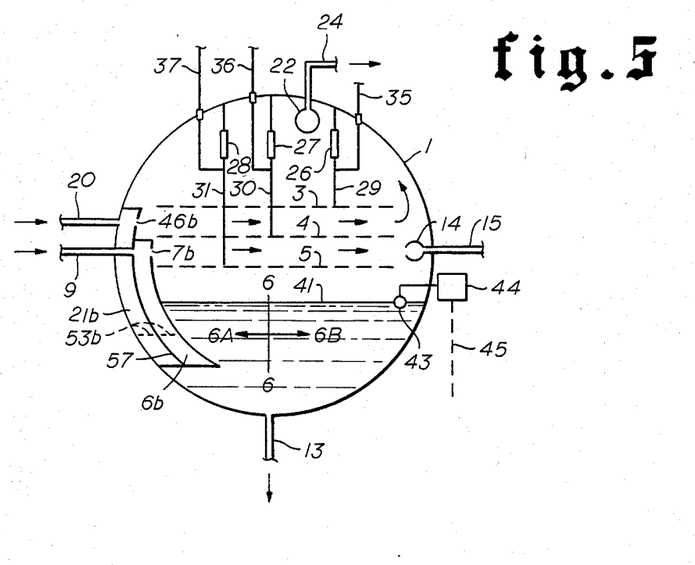
FIG. 5 is a schematic transverse cross-section of a further embodiment of the treating apparatus of this invention intended for serial stage operation.
Figure 6:
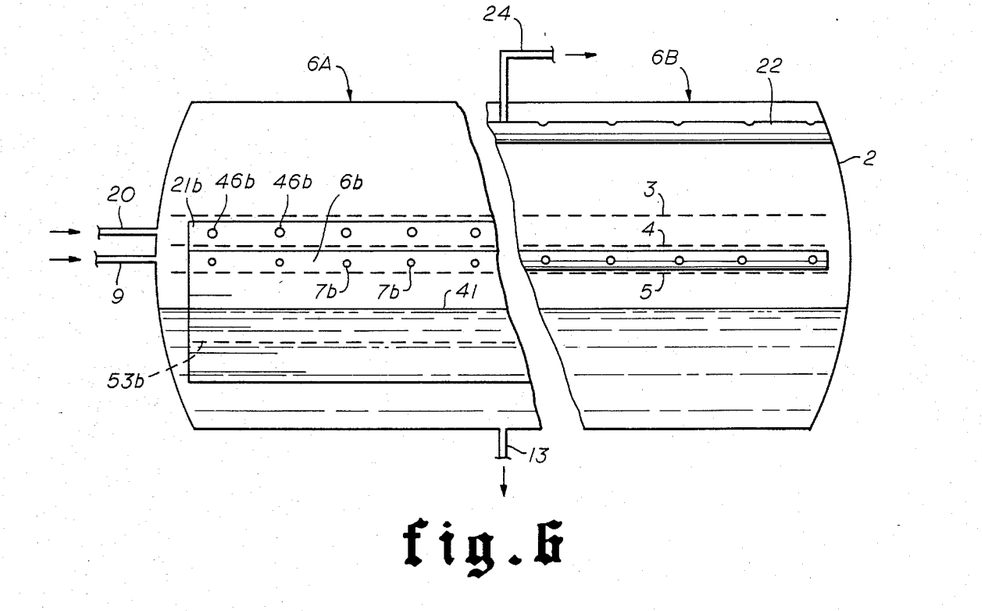
FIG. 6 is a longitudinal vertical cross-section taken along lines 6—6 of the treater shown in FIG. 5; 6A and 6B being partial length sections taken in the direction of arrows 6A and 6B, respectively.

An embodiment of this invention employing a modified "pan type" distributor is shown in FIGS. 5 and 6. These figures illustrate a desalter also similar to that shown in FIGS. 1 and 2, the reference numerals corresponding to those employed in the latter figures for the same features, except that instead of pipe distributors, 6 and 21, concentric, relatively narrow inverted troughs (or "pans") 6b and 21b are employed. Trough 21b is positioned immediately adjacent to and concentric with a sidewall of vessel 1. Trough 6b is placed immediately adjacent to and concentric with trough 21b, the top 55 of trough 6b being at a lower level than the top 56 of trough 21b. The troughs are positioned so that their open bottom ends will extend into the water layer maintained in the lower part of vessel 1. An interface 53b exists in both troughs between the water and the incoming emulsion, this interface being at a lower level than the interface 41 between the water and oil layers in vessel 1. Troughs 21b and 6b are each provided with a horizontal, inwardly facing row of orifices 7b and 46b, respectively. The orifices 46b in trough 21b are positioned in that portion of trough 21b which extends above the top of trough 6b and face the space between electrodes 3 and 4. The orifices 7b in trough 6b face the space between electrodes 4 and 5. In a preferred form, as shown in FIGS. 5 and 6, troughs 6b and 21b are made integral with each other by sharing a common wall 57 where they adjoin each other. Trough 6b is fed by conduit 9 and trough 21b by conduit 20. The pressure of the water acting upwardly on the emulsions at interface 41, due to the differential head of water between that interface and interface 53b, forces the emulsions out of the orifices 7b and 46b and into the treating spaces between electrodes 4 and 5 and 3 and 4, respectively, with sufficient velocity to cause the emulsions to move in the paths described in connection with FIGS. 1 and 2. The operation of the desalter is otherwise as described in connection with these figures.

Figure 7:
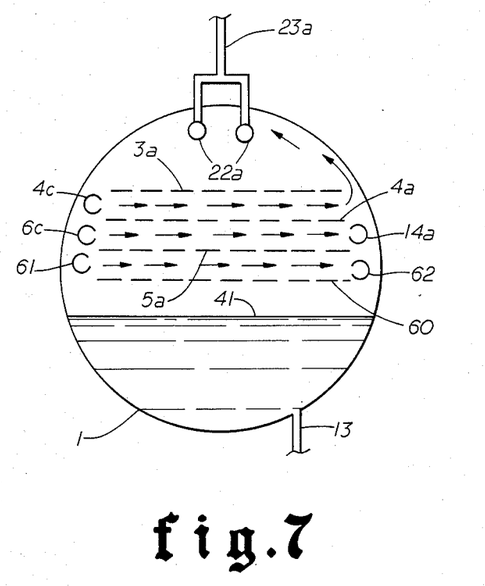
FIG. 7 is a schematic transverse cross-section of an embodiment of the treating apparatus of the present invention as adapted for three stage serial operation.

The treaters described above may be adapted to three or more stage treatment. FIG. 7 is a schematic representation of a vertical cross-section of a desalter employing three desalting stages in series. The reference numerals correspond to those employed in FIGS. 1 and 2 for the same or similar features. In this embodiment, a fourth planar, horizontally disposed electrode 60 is employed in addition to the three electrodes 3a, 4a and 5a, similar to those shown in FIGS. 1 and 2. Electrode 60 is positioned below electrode 5a. All the electrodes are preferably energized, although, optionally, electrode 5a or 4a may be at ground potential. An additional distributor 61, positioned between electrodes 5a and 60, is employed in addition to distributors 6c and 21c, and an additional interstage collector 62 is employed in addition to interstage collector 14a. The distributors are all shown as pipe distributors. In this embodiment, distributor 61 serves as the first stage distributor, distributor 6c as the second stage distributor, and distributor 21c as the third stage distributor. Water for desalting is supplied to each desalting stage, fresh water being preferably employed in the third stage and recycle water in the first stage. The treated product leaves the vessel 1 through outlet collector 22a and conduit 23a and water is removed through conduit 13. The various conduits, valves and pumps removing and supplying fluids to and from the various stages and the electrical circuitry are not shown, but their nature will be evident from the descriptions of the embodiments shown in FIGS. 1 and 2.

In an analogous manner to that of FIG. 7, desalters with more than three serial stages may be constructed.

Any of the above described embodiments may be modified for operation of the stages in parallel rather than in series. As explained in the Martin patents above referred to, parallel stage desalters have the potential of doubling the oil handling capacity of a typical single stage system.

Figure 8:
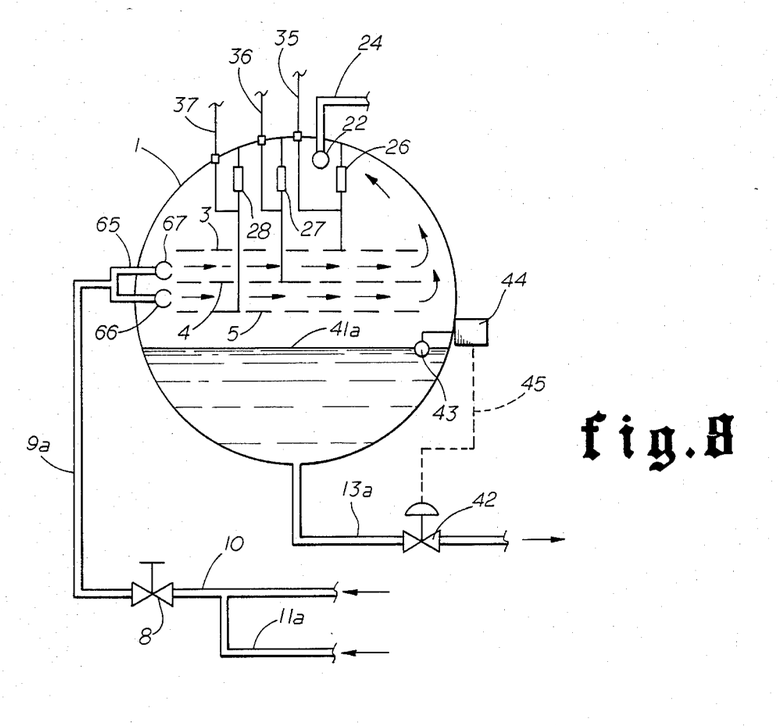
FIG. 8 is a schematic transverse vertical cross-section of an embodiment of the treater of the present invention as adapted for parallel stage operation.

FIG. 8 is a vertical cross-section of a desalter having two parallel stages. The reference numerals in this figure correspond to those employed in FIGS. 1 and 2 for the same or similar features. Raw oil is introduced through conduit 10 and water through conduit 11a. The streams are mixed in mixing valve 8 and introduced via conduit 9a into distributor 65 having two distributor headers in the form of pipes 66 and 67 adjacent to the sidewall of vessel 1, each pipe being provided with a horizontal row of orifices facing, respectively, the spaces between electrodes 4 and 5 and electrodes 3 and 4. The oil-water mixture then flows in parallel paths between electrodes 4 and 5 and electrodes 3 and 4 to the opposite side of vessel 1 and thence in a generally upward direction toward outlet collector 22 where the treated oil is withdrawn. The salt-containing water is separated from the oil-water mixture by the passage between the electrodes and drops downward into the pool of water at the bottom of vessel 1. The level of this pool, represented by interface 41a is maintained by effluent conduit 13a, float 43, control unit 44, interconnection 45 and motor valve 42, as described in connection with FIGS. 1 and 2.

Figures 8A, 8B:
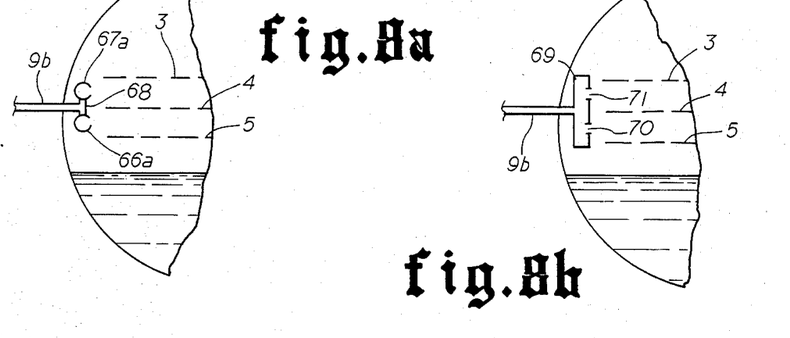
FIGS. 8a, 8b, 8c, 8d, 8e, 8f and 8g illustrate modifications of the distributor arrangement of FIG. 8.
Figures 8C, 8D:
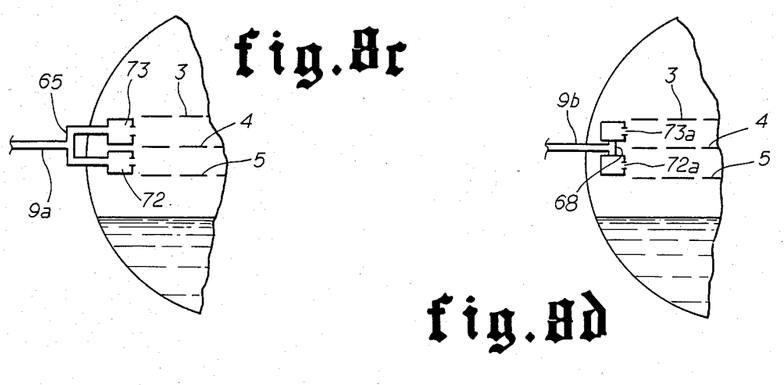
Figures 8E, 8F, 8G:
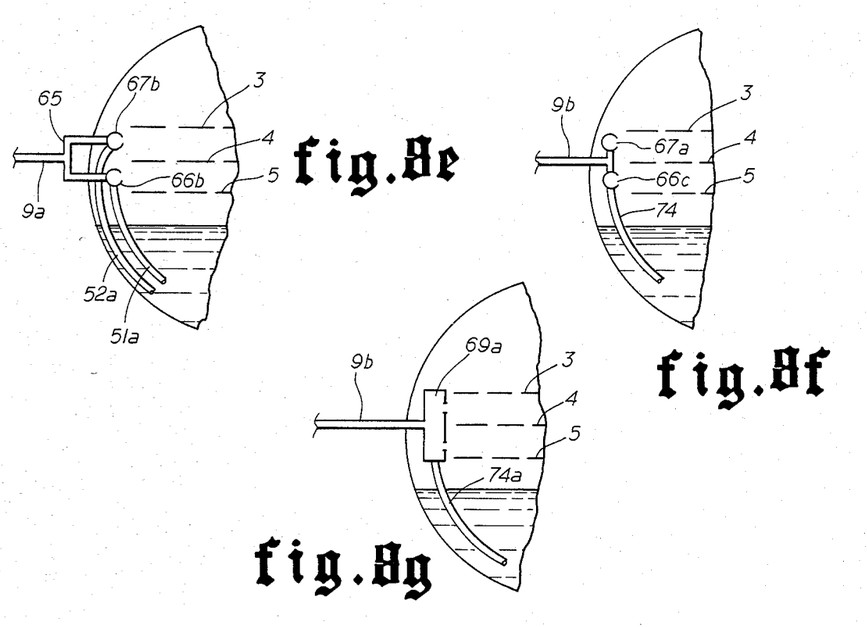

FIGS. 8a, 8b, 8c, 8d, 8e, 8f and 8g illustrate modifications of the distributor arrangement of FIG. 8. In FIG. 8a, the distributor headers 66a and 67a are pipes as in FIG. 8, but are hydraulically connected to each other inside vessel 1 by conduit 68, which is hydraulically connected to feed conduit 9b. In FIG. 8b, a single box-like header 69, directly connected hydraulically to feed conduit 9b, is employed. Header 69 is provided with two horizontal rows of orifices 70 and 71, which face the spacing between electrodes 4 and 5, and 3 and 4, respectively. In FIG. 8c the distributor differs from that of FIG. 8 only in that individual box-like headers 72 and 73 are substituted for the pipe headers 66 and 67 of FIG. 8. In FIG. 8d, the distributor similarly differs from that of FIG. 8a only in that individual box-like headers 72a and 73a are substituted for the pipe headers of FIG. 8a. In FIG. 8e, a distributor similar to that of FIG. 8 is employed, except that the headers 66b and 67b are provided with arcuate conduits 51a and 52a, respectively, open at their bottom ends and adapted to extend into the water layer, as in FIGS. 3 and 4. In FIG. 8f, a distributor like that of FIG. 8a is shown, except that header 66c is provided with arcuate conduits 74 similar to those shown in FIG. 8e. FIG. 8g shows a distributor like that of FIG. 8b, except that box-like header 69a is provided with such a conduit 74a.

Distributor systems as shown in FIGS. 8e, 8f and 8g are described and claimed in the above-referred to Watson application Ser. No. 187,279.

It is to be understood that all the electrode arrangements and potential differences between electrodes disclosed for serial stage apparatus may also be employed for parallel stage apparatus and vice versa. Similarly preferred process parameters such as oil temperature, oil pressure and demulsifer addition, as described in connection with serial stage operation apply also to parallel stage desalting.

As evident from the foregoing description, the nature of the distributor means is not critical, so long as the distributor is positioned at one side of the vessel and the emulsion is caused to flow to the opposite side between adjacent electrodes in hydraulically substantially independent flow. It will also be apparent that the invention is not limited to a particular shape of vessel, electrical circuitry, voltage employed, arrangement of conduits, interface level control means, etc. Many embodiments, modifications, developments and variations of forms are contemplated as long as they fall within the broad scope of the appended claims.

I claim:

1. An apparatus for desalting oil-continuous oil-water emulsions in plural parallel stages, said apparatus comprising a closed horizontally disposed vessel, generally cylindrical in form, there being contained within said closed vessel at least three horizontally disposed permeable planar electrodes in vertically spaced relationship, each said electrode extending substantially the entire length and width of said vessel, said electrodes thereby defining a plurality of hydraulically substantially independent coalescing stages;

distributor means positioned at and extending longitudinally along one side of said vessel and adapted to cause parallel flow of emulsion transversely from said one side to the opposite side of said vessel between adjacent planar electrodes which respectively define each of said plural stages;

conduit means for supplying emulsion to said distributor means;

product withdrawal means in the upper portion of said vessel;

water withdrawal means in the lower portion of said vessel;

said permeable electrodes and the vessel interior being adapted and arranged to permit water to pass downwardly through said electrodes to the lower portion of said vessel.

2. The apparatus of claim 1 wherein the top, middle and bottom electrodes are all energized.

3. The apparatus of claim 1 further comprising means for controlling the level of the water in the lower portion of said vessel at a predetermined position.

4. The apparatus of claim 3 further comprising mixing means adapted to supply oil-water emulsion to said conduit means for supplying oil-water emulsion to said distributor means; and conduit means for supplying said oil-water emulsion to said mixing means.

5. The apparatus of claim 1 wherein said vessel is substantially longer in horizontal length than in width.

* * * * *